US007874005B2

(12) United States Patent
Picolli

(10) Patent No.: US 7,874,005 B2
(45) Date of Patent: Jan. 18, 2011

(54) SYSTEM AND METHOD FOR NON-LAW ENFORCEMENT ENTITIES TO CONDUCT CHECKS USING LAW ENFORCEMENT RESTRICTED DATABASES

(75) Inventor: Richard Picolli, Rutherford, NJ (US)

(73) Assignee: Gold Type Business Machines, East Rutherford, NJ (US)

( * ) Notice: Subject to any disclaimer, the term of this patent is extended or adjusted under 35 U.S.C. 154(b) by 973 days.

(21) Appl. No.: 11/402,215

(22) Filed: Apr. 11, 2006

(65) Prior Publication Data

US 2007/0239473 A1 Oct. 11, 2007

(51) Int. Cl.
*G06F 7/04* (2006.01)
*G06F 17/30* (2006.01)

(52) U.S. Cl. .............................. 726/26; 726/2; 726/23; 726/27; 726/30; 713/161; 713/165; 713/152; 713/153

(58) Field of Classification Search .................... 726/2, 726/3, 26; 902/5
See application file for complete search history.

(56) References Cited

U.S. PATENT DOCUMENTS

| | | | | |
|---|---|---|---|---|
| 6,621,422 | B2 | 9/2003 | Rubenstein | |
| 6,690,294 | B1 | 2/2004 | Zierden | |
| 7,494,060 | B2 * | 2/2009 | Zagami | 235/382 |
| 2002/0116247 | A1 | 8/2002 | Tucker et al. | |
| 2004/0103147 | A1 | 5/2004 | Flesher et al. | |
| 2004/0111639 | A1 | 6/2004 | Schwartz et al. | |
| 2005/0086168 | A1 * | 4/2005 | Alvarez et al. | 705/41 |
| 2006/0018520 | A1 * | 1/2006 | Holloran | 382/116 |
| 2006/0161435 | A1 * | 7/2006 | Atef et al. | 704/246 |
| 2006/0184801 | A1 * | 8/2006 | Wood et al. | 713/186 |
| 2006/0206724 | A1 * | 9/2006 | Schaufele et al. | 713/186 |

FOREIGN PATENT DOCUMENTS

| | | |
|---|---|---|
| WO | WO 98/41953 | 9/1998 |

(Continued)

OTHER PUBLICATIONS

Web Site—www.bio-key.com/artman/publish/article_399.shtml—Printout attached—3 pages.

(Continued)

*Primary Examiner*—Taghi T Arani
*Assistant Examiner*—Mohammad L Rahman
(74) *Attorney, Agent, or Firm*—Klauber & Jackson LLC

(57) ABSTRACT

The present invention relates to a method and a system by which non-law enforcement operator(s) can conduct checks (requests, queries or searches) against CJIS (Criminal Justice Information System), NCIC (National Criminal Information Center) and other law enforcement only secure databases and comply with the rules and regulations for disseminating such data. In doing so, the invention provides for a system and process by which the checks (request, queries or searches) of individuals and/or articles are made against the CJIS/NCIC and/or other "law enforcement only" restricted databases, such that the indicia relating to persons and/or articles is compared with said databases. The resulting information regarding matches (and, in certain embodiments, non-matching results) flows to law enforcement officials so that they may use any results deemed relevant for response thereto. Said responses may vary, but in one embodiment, may provide for at least the notification of non-law enforcement operator who originated the above-described checks.

6 Claims, 5 Drawing Sheets

FOREIGN PATENT DOCUMENTS

WO WO 2006/020025 2/2006

OTHER PUBLICATIONS

Web Site—www.info-cop.com—Printout attached—1 page.

Web Site—www.atsva.com/content.cfm?id=20—Printout attached—1 page.

Web Site—www.motorola.com/governmentandenterprise-uat/northamerica/en-us/public/functio . . . —Printout attached—3 pages.

* cited by examiner

**Illustration of CJIS/NCIC data model for *Non-Law Enforcement* Users**

SYSTEM AND METHOD FOR NON-LAW ENFORCEMENT ENTITIES TO CONDUCT CHECKS USING LAW ENFORCEMENT RESTRICTED DATABASES

FIELD OF THE INVENTION

The present invention relates to a computer-based system and method that allows third parties such as corporations and other private, non-law enforcement entities to avail themselves of criminal databases checks that are currently permitted for use by law enforcement, without violating the legal prohibitions against non-law enforcement usage of such databases.

BACKGROUND OF THE INVENTION

Law enforcement entities currently have certain computer systems and other hardware to perform real time field checks on individuals, vehicles and articles. Typically, these checks are performed by submitting identity indicia to be checked against Federal and/or local criminal check systems such as CJIS (Criminal Justice Information System) or NCIC (National Criminal Information Center), and other sensitive law enforcement only databases. While certain inter-departmental law enforcement sharing of information has increased the productivity and efficiency of law enforcement, it is evident that law enforcement cannot be everywhere, all the time. To this end, a limited number of law enforcement resources would necessitate an efficient information sharing of private and public security resources so that the reach of law enforcement can be legitimately expanded in the ongoing efforts to fight crime and terrorism.

To make matters worse, critical infrastructure (such as power plants, chemical or nuclear facilities, bridges, skyscrapers, ports, etc.) and other important facilities are often controlled, if not owned, by private entities. Frequently, the premises of critical infrastructure and important facilities may be watched by private security guards or teams. Given this reality, and considering the logistical and physical limitations on law enforcement in helping to protect the public, it is wise to consider options that might involve private corporations and private individuals (such as private security forces of designated facilities and infrastructure) who could assist in preventing and/or solving acts of crime and terrorism that might transpire in connection with, or on the premises of such private entities. Unfortunately, current private/law enforcement partnerships tend to include such programs like community outreach, neighborhood watches, etc. and typically do not offer a concrete way to combat crime and homeland security. Moreover, private entities who may control important facilities and infrastructure do not really benefit from such partnerships, particularly given that such private entities have no reliable way to conduct checks of their own on those that enter on their premises, as access to law enforcement databases is restricted to public law enforcement only. Thus, without such capabilities, the current "checks" (e.g., having sign in sheets, writing down ID and license plate numbers, etc.) that private entities may do on those who enter their premises is of little benefit to either the private entity, in terms of protecting its property and on-site persons, and is of virtually no benefit to law enforcement in preventing or solving illegal activities. As such, there is a need for a private-public mechanism that allows credible security checks of private property entrants at designated sites through law-enforcement avenues, without running afoul of prohibitions against private access to sensitive law-enforcement databases.

SUMMARY OF THE INVENTION

On its broadest level, the invention relates to a computer based system for providing designated private entities (e.g. companies, schools, and non-law enforcement individuals etc.) with a means to log individuals entering their premises by their drivers license and/or license plate number, and to have it checked in real time or through an offline database through Federal and/or local criminal check systems such as CJIS (Criminal Justice Information System), NCIC (National Criminal Information Center), and/or other criminal or law enforcement restricted databases. In doing so, designated private entities may indirectly conduct real-time checks on subjects such as individuals, vehicles, and articles that are on their premises by forwarding subject identification data or indicia such as license plate numbers, driver license numbers, serial numbers, social security numbers, passport numbers, etc. to the law enforcement controlled criminal databases. Once the relevant indicia is checked against the target database(s), a result is then forwarded to designated law enforcement agencies so that they may take appropriate action as necessary. When provided in this manner, a public-private network information sharing system partnership is developed, such that law enforcement would then be able to receive expanded information from private entities, while the private entities are able to afford themselves of improved security through the reception of law enforcement response(s) to any relevant matches that may happen to emanate from their submissions to law enforcement databases.

In one embodiment of the system, the private entity offers or submits information to the criminal check systems regarding the location of persons or articles on its property, and if the indicia sent matches with the criminal check system records, or if for any other reason the person or property is deemed to be of interest, then the interested law enforcement agent(s) (e.g., those that are specifically linked or associated with the local query and/or others that may have a need to be interested based on other considerations) will then choose how to respond, based on the submission(s) that originated from the non-law enforcement (e.g. private, third party) entities via the system. In one embodiment, if the person entering is a not criminal, terrorist, or other person of interest (or if the article or vehicle is not stolen or otherwise wanted), then the check will not flag the entrant (or item), but otherwise, if there is a "match", then law enforcement may be notified so that they may respond in real time, if needed.

Because government (e.g., law enforcement) criminal check systems do not permit the dissemination of this data to non-law enforcement entities or operators, in one embodiment, law enforcement, rather than the private entity (or their operator) that submitted the information relating to the person, article or vehicle, will receive the "match" response (if any). Thus, in one embodiment, the non-law enforcement entity making the request would get back a response as to whether the check being conducted is clear/not clear response. This avoids the dissemination of this sensitive data to non-authorized (e.g., non-law enforcement) entities, and yields a benefit for the non-law enforcement entities and a benefit for law enforcement.

However, in an alternate embodiment, the private entity may instead thereafter receive a response from law enforcement so that they may be alerted to the presence of certain, say, dangerous people or wanted property on their premises. Either way, the response may be an alert, no alert, or may be in the form of a law enforcement visit to the originating location.

The benefits for a private entity are that the physical security will increase from their use of the law enforcement systems in cases where it ordinarily might not because of legal restrictions on private usage. Similarly, law enforcement benefits by receiving information that it would not normally have, but for the help of private entities who are trying to further secure their own premises. Provision of such allows for superior security over systems where say, police officers run criminal and checks pursuant to a traffic stop of a motorist. In those systems, the private entity (who is prohibited by law from using this same system) is not supplying identification data from potential criminals, terrorists, etc. who may be entrants on their premises.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE INVENTION

At its broadest level, the present invention provides for a computer system, method, and a computer based product, including computer operated instructions, for securing critical infrastructure and important facilities comprising the receiving by computer system resident within a law-enforcement controlled domain of identification indicia that has been input from at least one third party originator, so that the identification indicia may be compared with criminal records of at least one database of a law-enforcement network that is connected to said computer system resident within the law enforcement-controlled domain, in order to generate a response from the input of the originating third party. The response may indicate an existence of a match between the identification indicia and the criminal records, such that there will be an output of the response to at least a location within a law enforcement-controlled domain. In particular, the step of receiving the identification indicia may be effectuated by the provision of substantially uniformly formatted input from at least one third party originator and may further include receiving identification indicia relating to at least a third party identification and a subject identification. The outputting of a response may be directed to a designated law enforcement operator for further review and taking of responsive action as needed, while the outputting of the same response may be made to the third party originator where there is an all clear indication (e.g., where there is no said match between said identification indicia and said criminal records), but alternatively, where there is at least one said match between said identification indicia and said criminal records, there can be provision for preventing the outputting of the response to said third party originator. The response may be preserved for record keeping within the law enforcement domain as needed, and may further include, where a match exists between said identification indicia and the criminal records, an alert to prompt said taking of responsive action based on the particular type of match generated.

Figure 1:
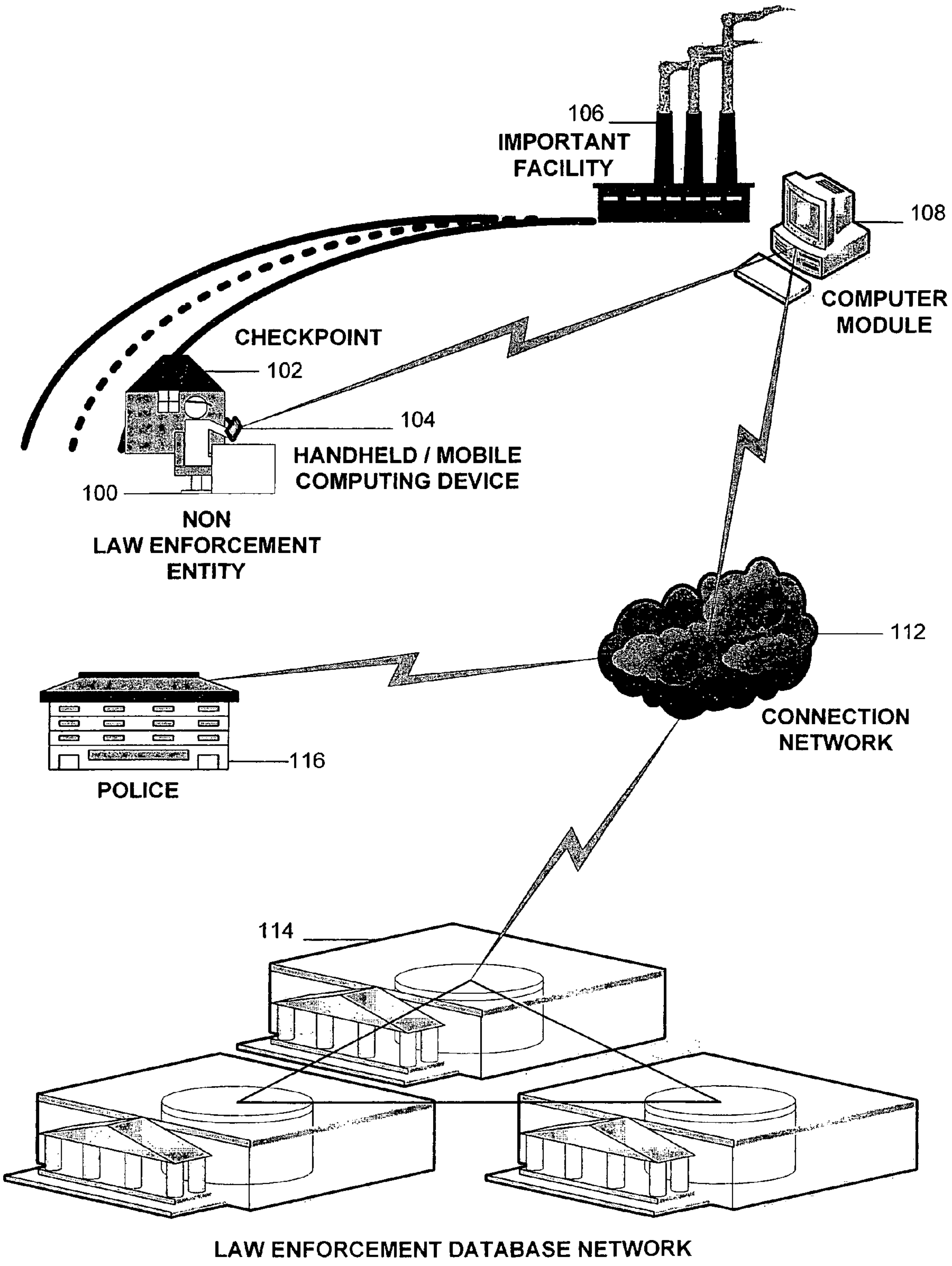
FIG. 1 is an exemplary depiction of the physical instantiation of an information flow path between a non-law enforcement, private entity operator and the relevant law enforcement environment in accordance with the system of FIG. 2 as described hereafter.

With general reference then to FIG. 1, the inventive method and system provides the advantages described herein by providing for a non-law enforcement (e.g., private) entity (or their operator as used interchangebly herein) 100 at a checkpoint 102 locate at or in proximity to the physical premises of the critical infrastructure or other important facility 106 of the private entity with a solution for inputting information pertaining at least to the identity indicia of a vehicle, person or article (not depicted) into any wired or wireless input device (such as a PDA, mobile computer, PC, cell phone, or other device) and any related keyboard, display, scanner, digital camera, other digital imaging products (not depicted) and an interface to a wired or wireless private network 110 for transmission through a connection network 112 for processing through at least one law enforcement database network 114.

In one embodiment, input device 104 may comprise a handheld or mobile computing device utilizing software such as the Info-Cop™ software marketed by GTBM, Inc. of East Rutherford, N.J. Input device 104 may be located at the appropriate security checkpoint 102, of say, chemical plant entrances, transportation hubs, schools, hospitals, nuclear power plants, ports, and other critical infrastructure or important facility, and may be located in a vehicle, carried by a security individual, or retained in other suitable fixed and mobile locations. For example fixed locations may include parking lots, receiving loading docks and other security checkpoints. Operator 100 of input device 104 may be non-law enforcement personnel, private security personnel, and other suitable personnel who might be employed by the designate private entity to help secure the physical premises of the critical infrastructure or important facility.

Whether propagated immediately through certain channels to a law enforcement database network interface, or whether first pre-processed locally (e.g., through a private database or computer module 108 in connection either wired or wireless private network with 110 with said input device 104) before transmission via network 112 (which may be wired, wireless, or any other connective network, and may be via the internet, WAN, or any other network as known in the art) to the given law enforcement database network 114, the data relating to the given input or query propagated by the private (third party) operator 100 contains data signals that convey identity indicia that would go to at least one server located within a given law enforcement-controlled domain at 114, which would then process the query or information through criminal databases such as the CJIS and NCIC databases and/or any other law enforcement databases for checking information pertaining to the vehicle, person, or article being checked, according to a originating (third party originator) operator ID tag or identification information (not depicted) that indicated that the originating source of the request/information was "non-law enforcement". In many cases, the CJIS/NCIC and other law enforcement-only databases that may comprise law enforcement database network 114 will typically be searchable databases from which queries are processed for matches of data and affiliated data, but the results must, as described elsewhere herein, be processed in accordance with the third party identification, so that certain (if not all, depending on the particular laws of the jurisdiction) responses or results may need to forwarded to the designated law enforcement agent.

To this end, the server(s) of the law enforcement database network 114 would process the information being checked. In order to do so, a query will be run according to standard database querying techniques known in the art, to see if (any of) the database(s) has (have) returned any "hits" on the information (also known as matches). Any such results, whether hits or not, may, in one embodiment, notify the requesting non-law enforcement user if the person, vehicle, or article is "Cleared" or "Not Cleared" in real time via the input device 104. Thus, if the check results come back as an "all cleared" indication, the operator 100 is notified with one type of message and all pertinent information about the check is logged with date, time, operator information and all demographics on the vehicle, person or, article being checked. If a "hit" (match) is returned by the law enforcement database network 114, chance are that the particular database is a law enforcement-only (e.g., restricted) database, such that the results from the check or submitted information must (based on the presence of a "non-law enforcement operator" ID tag in the data packet of the query) be redirected to an authorized, designated law enforcement operator 116 (whether local police department, police dispatching center(s), state police, FBI, etc. as designated based on geographic and/or subject matter jurisdiction concerns) for review and the taking of responsive action by law enforcement, and may optionally provide for an alert to prompt the same, based on the kind of match. When provided as such, the originating input operator would then be notified with an appropriate message that would not violate the pertinent rules relating to the dissemination of this restricted information from the database(s) of the law enforcement database network 114.

Figure 2:
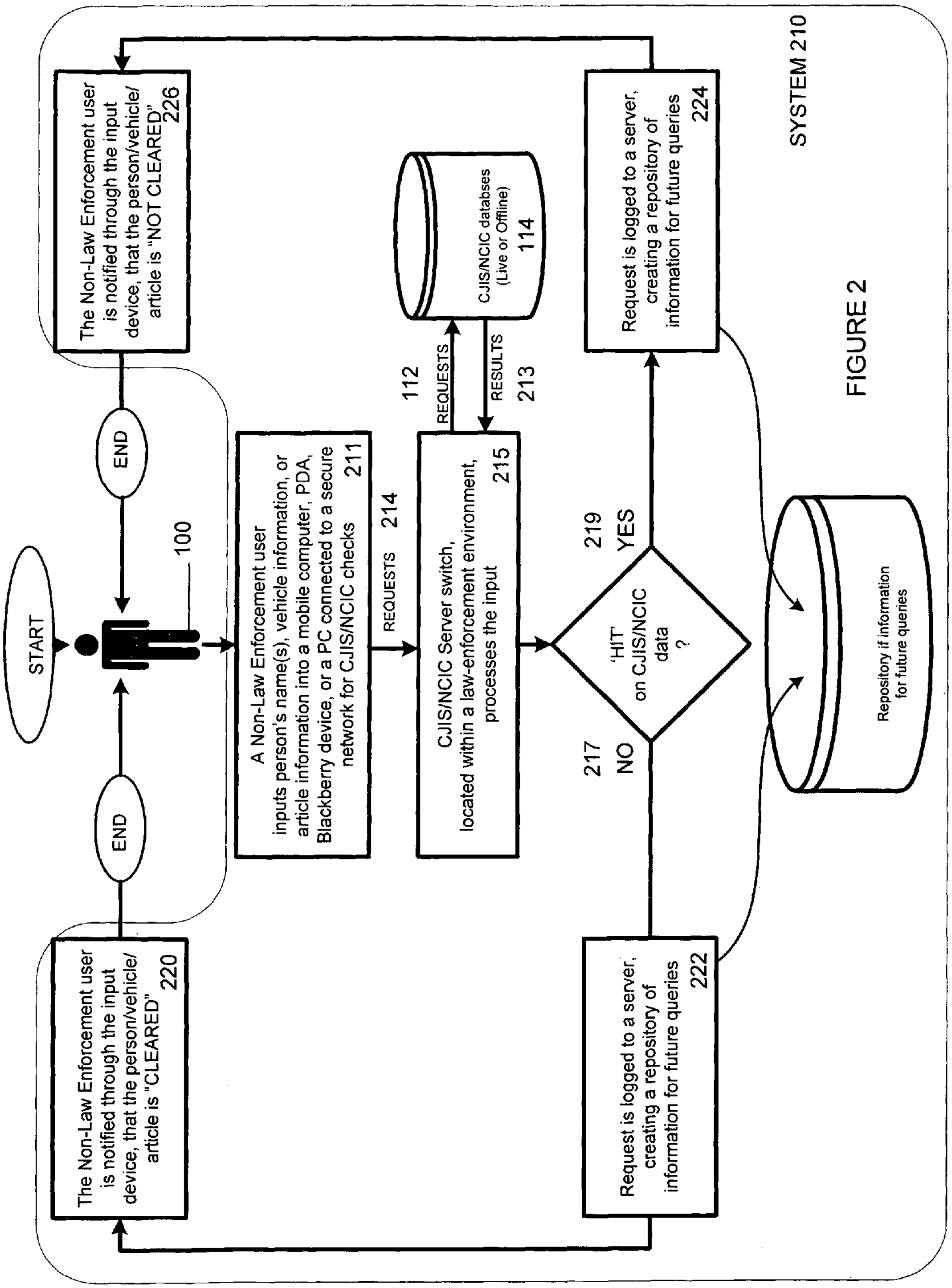
FIG. 2 is an exemplary block diagram rendering of the interconnectivity of the inventive system by which non-law enforcement (private entity) operator(s) can conduct checks against various law enforcement databases.

Accordingly, FIG. 2 illustrates an exemplary system 210 according to the inventive system and method of providing non-law enforcement operators 100 with the capability of real time checks of the various articles or persons on the property of the private entity. System 210 comprises the fixed or mobile device 104, at least one response or result 213, a wireless network 214, a server 215, a plurality of computer readable storage modules 216 and 218 (e.g., databases). System 210 is operable to provide the capability for checking against the law enforcement databases 114. System 210 supports the updating of the database(s) of law enforcement database network 114 in response to checks (requests 214) generated by the fixed or mobile devices 104 and creation of at least one result 213 returned by a computer based system or server associated with law enforcement database network 114. Results are directed to authorized users or operators based on profiles associated with users and the results of the checks sent to law enforcement databases 114. Further, system 210 provides the capability for controlling access to databases and results of checks based on the operator's device 104 and his user identification as evidenced by the operator ID tag described hereafter.

With reference now to FIG. 2, checks 211 may comprise information regarding occurrences and situations encountered by operators 100 of input device 104. As described above, network 112 may comprise any wired or wireless data communication system operable to communicate data between input device 104 and the law enforcement database network 114, but in one embodiment may comprise a wireless network utilizing Cellular Digital Packet Data (CDPD) or (CDMA) communications (or other others, such as GPRS, EVDO, etc.) that is capable of providing substantially uniformly formatted output (e.g., input from operator 100 of the third party originator to the law enforcement database network 114). In one embodiment, a software module is provided at the third party location for installation on the input device 104 that will have a common data input interface that, as one skilled in the art may appreciate, may be configured in different ways as needed depending on the exact input device 104 used, and according to the realities of the particular application. This software module will, in one embodiment, be user-friendly and will have computer-based instructions therein for providing substantially uniformly formatted output (e.g., input from operator 100 of the third party originator to the law enforcement database network 114). In an alternative embodiment, it is possible for the common data input interface to also be pushed from the law enforcement domain onto the input device 104 as needed.

As detailed, one embodiment provides for a law enforcement server-based switch or interface 215 within the law enforcement domain that can be used for processing the originating request after it leaves the non-law enforcement domain. The interface 215 may comprise any general purpose or specialized computing device known in the art for parsing incoming data from connected nodes, so that it can examine data received directly from fixed or mobile entity device 104 or indirectly via private server module 108 and private network with 110. More specifically, interface 215 may determine which data to pass on from device 104 to law enforcement database network 114, and later on, back to device 104 or to private network 110. Interface 215 may also comprise input and output devices for receiving information directly. For example, specific messages may be entered at a server of the interface 215 instead of being received from device 104. Data may also be entered at a terminal associated with a server of interface 215. In one embodiment, the interface 215 may typically be associated with a particular precinct or organizational unit associated with law enforcement and other suitable entities. For example, a server of interface 215 may be associated with each precinct in a city, with the city as a whole, or in some other combination of precincts and cities. Interface 215 may therefore comprise a simple server for handling checks 214 (request, queries or searches) at 211 or a more powerful server. Any given server of interface 215 may be networked to additional servers (not depicted) as desired and configured. In one embodiment, interface 215 may comprise (not all of which is depicted) a central processing unit (CPU) (not depicted) and computer readable storage (not depicted), a notification module (essentially code indicating access rights (largely dictated by the preset originating ID tag received), standard messages (notifications) to be generated, and decision trees relevant to the sending of the various messages based upon said access rights), and a plurality of user profiles and software to process results based on established criteria, all of which can be programmed in accordance with the best manner determined by one skilled in the art. To this end, interface 215 may comprise an executable software module to receive the check 211 from input device 104, generates a response results 213 at steps 220 ("cleared") or 226 ("not cleared") for forwarding to input device 104 after executing steps 217 (determining that no match or "hit" is applicable) or step 219 (determining that a match or "hit" is applicable), and after logging the relevant data from requests at 222 or 224 for future use and record keeping, all of which is described hereafter in greater detail in FIG. 5. Alternatively, as mentioned above, one separate embodiment would provide for modifying the above so that the private entity and/or its operator 100 would not receive such cleared/not cleared messages, but would instead receive no particular response, save emergency notification or follow up police visits.

Figure 3:
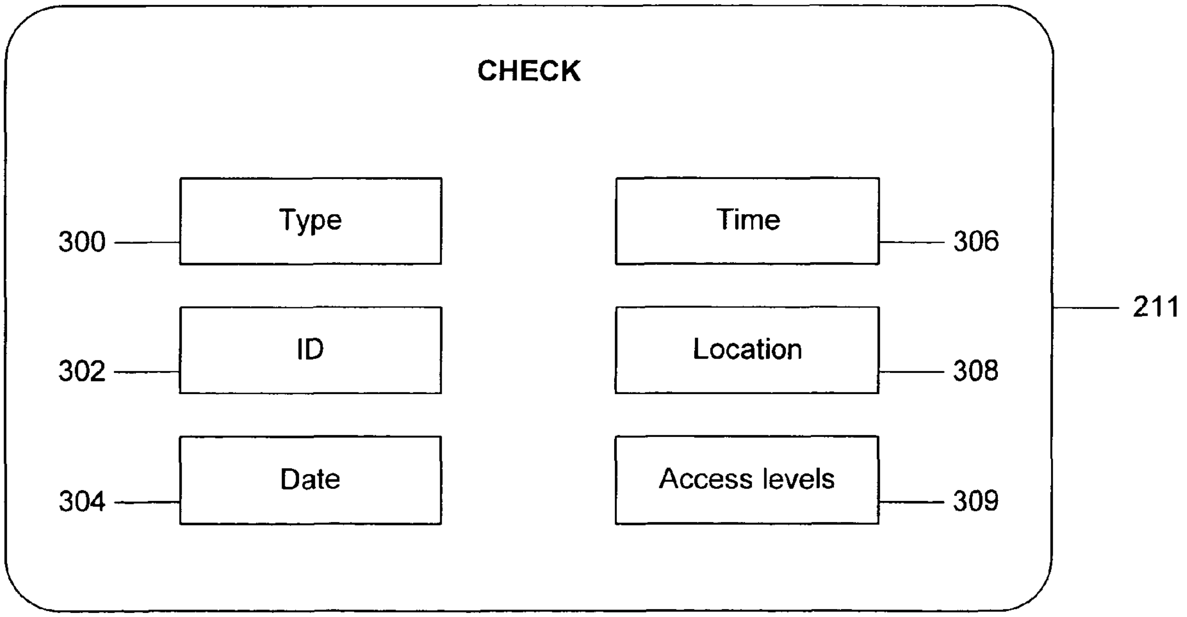
FIG. 3 is an illustrative graphical depiction of dome of the details that may form the basis of the data involved in a check (e.g., submission event) by the private entity operator in accordance with the system of FIGS. 1 and 2.

Turning then to FIG. 3 is a block diagram illustrating details of a check 211 in accordance with the system of FIGS. 1 and 2. In one embodiment, check 311 comprises type 300, an ID tag 302, a date 304, a time 306, a location 308, one or more access levels 309. Type 300 comprises a numeric, alphanumeric or other value for indicating the kind of the check 311. Type 300 may be used to categorize checks 211. For example, type 300 may indicate a vehicle, a person, or an article such as a gun or sensitive. ID tag 302 comprises a numeric, alphanumeric or other value for uniquely identifying each check 211 and distinguishing checks 211 from each other. For example, ID tag 302 may comprise a check number. Date 304 indicates a month, day and year associated with a check 211, such as the date the check 211 occurred. Time 306 is a field that may indicate the time associated with the reporting time of a check 211. Location 308 comprises one or more indications of the location of the check 211 origin. For example location 308 may indicate that say, the Dow Company chemical plant in Perth Amboy, N.J. Location 308 may also be more detailed, such as the global positioning coordinates of where the entry device was when check 211 was sent.

Access levels 309 comprise one or more indications of exactly who may receive results of checks 211 from the law enforcement database network 114. Access levels 309 are configurable for each system user as the log on from input device 104/private network 110. For example, one type of access level 309 might indicate that security personal may not receive CJIS/NCIC or other sensitive law enforcement-only data. Yet another illustrative access level 309 might indicate that full CJIS/NCIS and other sensitive law enforcement-only data may be displayed. In general, access levels 309 may indicate different levels of access to particular elements of checks 211 to different types of users.

Figure 4:
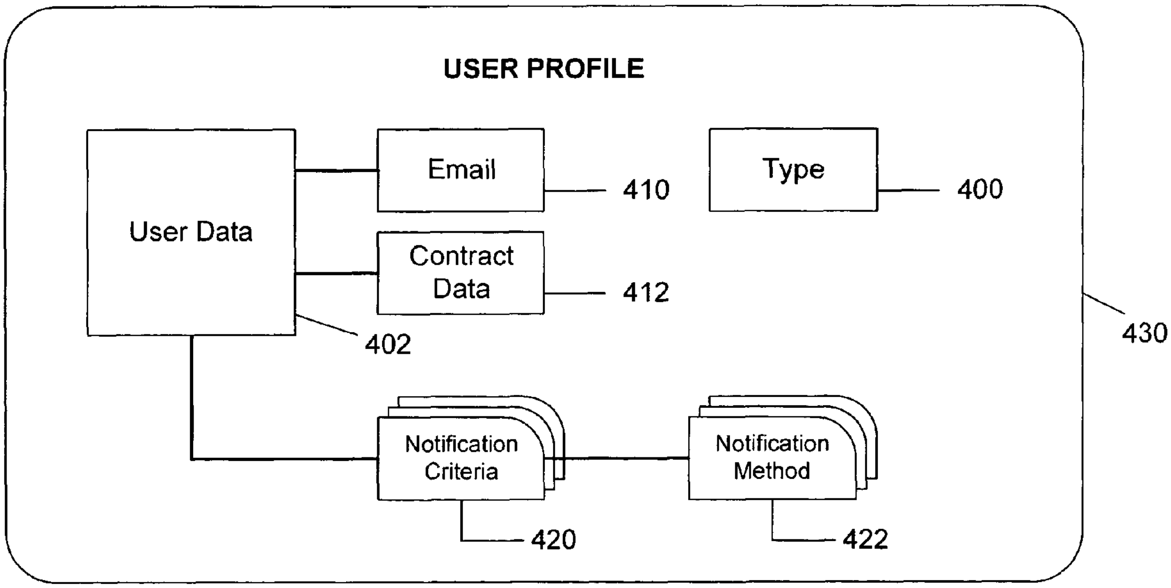
FIG. 4 is an exemplary block diagram illustrating the possible details of a user profile in accordance with the system of FIGS. 1 and 2.

With attention now to FIG. 4 depicted is an illustrative block diagram showing possible details of user profiles 430, which may comprises a type 300 and user data 302. Type 300 may comprise a numeric, alphanumeric or other identifier for indicating the type of user associated with profile 430. Type 300 may indicate whether the operator 100 is a non-law enforcement user or a law enforcement user. Type 300 may be used with access levels 309 to determine what checks 211 and the particular results thereof, may be provided to users. For example, a non-law enforcement operator 100 is not allowed to receive matching CJIS/NCIS data. In another example, a law enforcement user is allowed complete access to CJIS results and the results originating from non-law enforcement operators. In general access levels 309 may be configured to allow access to some, all or none of the date 304, time 306, location 308 and check 211 results 213 based on subscriber type 300.

As seen in FIG. 4, user data 402 comprises information about user in user profile 430. More specifically, user data 402 may comprise contact data 412 and an electronic email address 410. Contact data 412 may comprise name, department, address, phone number, host server and other user information associated with user profile 430. User data 402 indicates checks 211 which the particular operator 100 associated with profile 430 is interested in, and may comprise one or more notify criteria 420 and one or more notification methods 422. Each notification criteria 420 may comprise one or more elements of checks 211 indicating what the operator should receive notifications about. More specifically, each of the criteria 420 may indicate one or more items from check 211, such as date 304, time 306, location 308 and access levels 309, that indicate checks 211 of interest to authorized operators 100. For example, notify criteria 420 may specify only checks 211 with say, associated matching CJIS results to not get sent to originating input device 104/private network 110. Notify criteria 420 may also allow combination of items from checks 211 and redirection of results to appropriate other users in various methods. For example, a particular notify criteria 420 may indicate that check 211 results 213 be forwarded to the nearest law enforcement department user, and also be sent to additional law enforcement users but not sent to the originating operator 100 if the originator is a non-law enforcement user or operator.

Notification method 422 comprises an indication how to communicate checks 211 generated in response to notify criteria 420 regarding matches on checks 211. Typically, a notification method 422 is associated with each of the notify criteria 420. More specifically, notification method 422 indicates whether electronic mail, or other delivery methods should be used for communicating results to users associated to profiles. Multiple notification methods 422 may be associated with a single criterion 420, such as when a operator 100 desires to be notified by electronic mail and electronic page.

Accordingly, user profile 430 may comprise rules and other directives resident at server-based interface 215 for handling checks 211 received from a particular input device 104/private network 110 and is generated by a server at interface 215. For example, based on the particular checks 211 received and the respective data contained therein (illustratively type 300, ID tag 302, date 304, time 306, location 308, and access levels 309), profile 430 may direct that results of sensitive matching data not be provided to an originating input device 104/private network 110 based on access rights or a user authorization table (not depicted). Notification method 422 may comprise messages and responses to users, based on matches emanating from queries and the parsing of reformatted data (e.g., in easy to use fashion as may be appreciated by those skilled in the art) and then redirected to law enforcement users. The response to the non-law enforcement originator would therefore not include restricted sensitive data, so legal restrictions regarding use of the law enforcement databases 114 are thereby respected.

As stated above, user profile 430 may comprise, among other things, various information about operators and/or private (or even public) entities utilizing the system 210. User data 402 may be created and updated by an administrator (not depicted) associated with system 210 with the consent of a law enforcement user. User data 402 may therefore relate, among other things, to the identities of operators such as business security persons, school security persons, transportation facility security persons, hospital security persons and any other non-law enforcement organization or entity individually or collectively. Each user therefore has a profile 430. System 210 may provide a generic profile for classes of users, however each user and device ideally form a unique non-anonymous user for query origination logging and auditability. For example an administrator may generate the generic profiles manually for say, a chemical plant security entrance. By way of yet another example, a generic profile might be created for say, airport security stations. Either way, once in operation, one or more checks 211 are generated by input device 104/private network 110 and communicated to interface 215. As stated earlier, operators 100 generate checks 211 to perform security task anywhere. For example, a check 211 may therefore be generated at say, a chemical plant check point, at an airport security check point, at a parking facility, etc. However utilized, the device, user, location, date and time are always known on every check 211. In one possible embodiment, any results 213 generated may also be further classified and sorted at a server of interface 215. For example criteria 420 may indicate that a copy of certain results get further distributed to another server in a secure network system to further share important information beyond the nearest law enforcement station.

Figure 5:
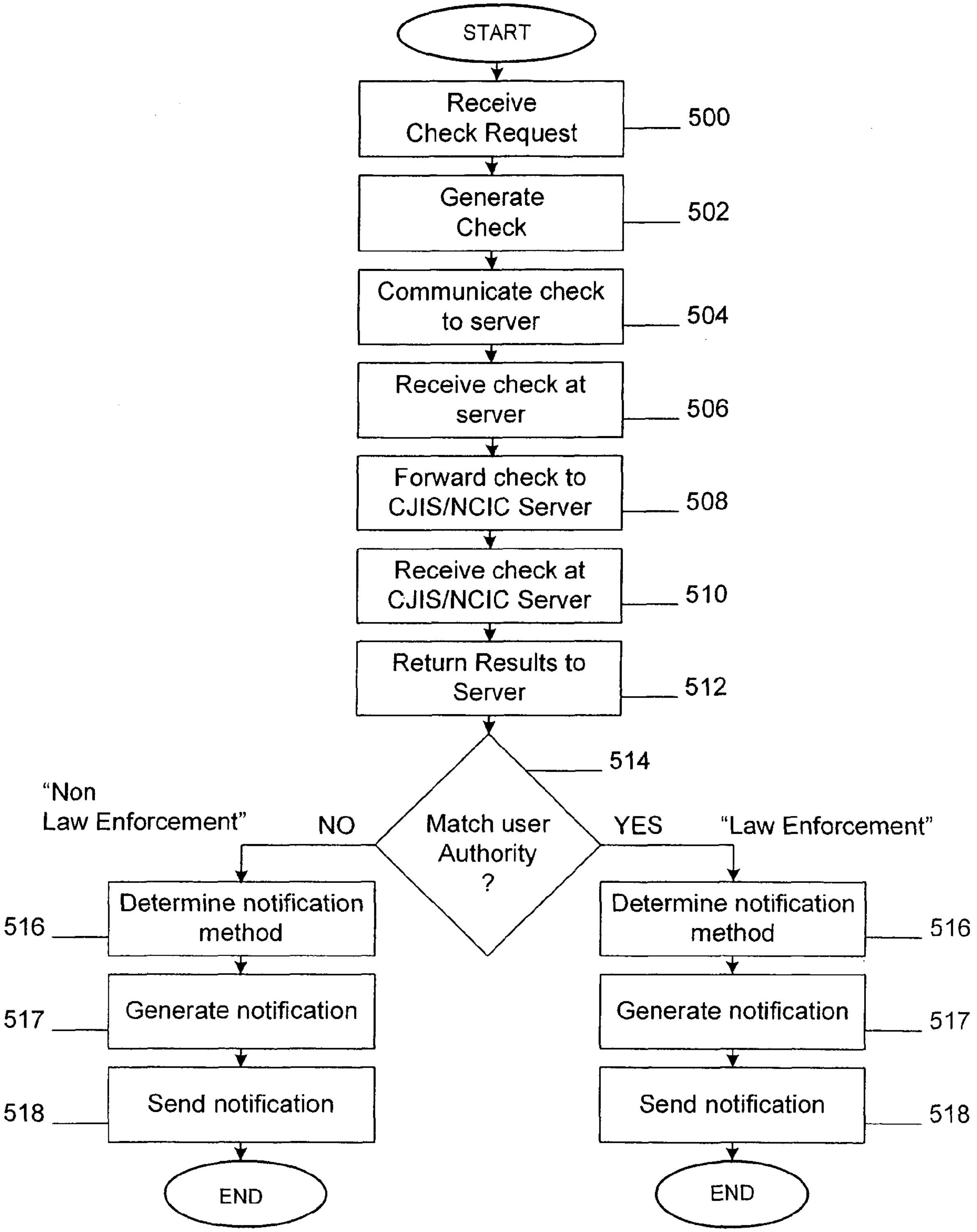
FIG. 5 is an illustrative flow diagram indicating one possible method of generating checks and the receiving of results in accordance with the system of FIGS. 1 and 2.

With attention now to FIG. 5 is depicted an exemplary flow diagram indicating a method for checking result responses for transmission to the appropriate operators 100. The method begins at step 500 where check request data is received at input device 104. The check request data may be received by a human operator 100 entering the information or by some other equivalent method. Next, at step 502, check 211 request is generated using the received check 211 request data. More specifically, type 300 is assigned to check 211 using the check information, date 304 and time 306 are set, type 300 is set to identify the input device 104 and/or the private network 110 generating the check 211 and is then sent to a server of interface 215. Then, at step 504, check 211 is communicated to a server within interface 215.

Proceeding then to step 506, check 211 is received at a server within interface 215, and step 508 entails the forwarding of the same to a database within the law enforcement database network 114. At step 510, the given server performs the check on the given database, and step 512 returns the results 213 of check 211 to the server of interface 215. In decisional step 514, the given server of interface 215 also determines whether operator 100 has access to matched checks 211, based on type 300 of operator 100 and access levels 309 of matched checks 211. If operator 100 should not, by definition, have access to law enforcement data, then the NO branch of decisional step 514 is followed. If, however, one or more of checks 211 meet notify criteria 420, then the YES branch of step 514, leading then to step 516. At step 516, system 210 determines the notification method 422 for each met notify criteria 420. Then, at step 517, notification method 422 is generated by system 210, as appropriate, for notification method 422. By way of just one illustrative example, a message and an email notification of results about a matched check are sent to law enforcement operators. Then in step 518, notification method 422 is communicated to the operators associated with the profile 430 with matched notify criteria 420. Notification method 422 may include all or a portion of the information in the given matched check 211. Access levels 309 associated with matched checks 211 may also limit the information included in notification method 422. For example non-law enforcement profiles may not get results which law enforcement profiles are authorized. While steps 516, 517, and 518 get followed regardless of the operator's 100 authorized level, the system 210 diverts and edits the allowed response to the operator 100 based on whether or not the operator 100 is law enforcement or non law enforcement.

It should be recognized that other changes, substitutions and alterations are also possible without departing from the spirit and scope of the present invention, as defined by the following claims.

I claim:

1. A process on a computer system for securing critical infrastructure and important facilities, said process consisting:

receiving, via immediate propagation from a connected node to a law enforcement database network interface connected to a computer system within a secure law-enforcement controlled domain, an operator ID tag and identification indicia that has been input according to a substantially uniform format from a wired or wireless input device having a common data input interface that is operated by at least one non-law enforcement authorized third party originator having access to said connected node, said identification indicia chosen from a group of indicia consisting of license plate numbers, driver license, serial numbers, social security numbers, or passport numbers;

parsing incoming said identification indicia from said connected node at said law enforcement database network interface;

generating notification of access rights for an authorized user to propagate said identification indicia to said law enforcement database network interface, said authorized user being further identified by said operator ID tag in a user profile;

comparing said identification indicia with records of at least one sensitive law enforcement-only database, said at least one sensitive law enforcement-only database chosen from the group consisting of a Criminal Justice Information System database, or a law enforcement restricted database that is connected to said computer system resident within said secure law enforcement-controlled domain, in order to generate a response to said input, said response indicating any existence of a match between said identification indicia and said records as a not cleared message, and indicating no match between said identification indicia and said records as a cleared message;

outputting, according to governmental prohibitions against dissemination of criminal justice information system data to non-law enforcement entities, said response only to said authorized user operating from a location within said secure law enforcement-controlled domain;

generating, as a result of said outputting of said response to a location connected with said secure law enforcement-controlled domain consisting of an alert to said at least one non-law enforcement authorized third party originator, no alert to said at least one third party originator, or a law enforcement visit to an originating location;

wherein said step of outputting said response to a designated law enforcement agent for further review and taking of responsive action as needed is preserved for record keeping within said secure law enforcement-controlled domain and further includes, where a match exists between said identification indicia and said records, an alert to both said designated law enforcement agent and said at least one non-law enforcement authorized third party originator to prompt said taking of responsive action designate law enforcement agent and said based on the particular type of match generated.

2. The process of claim 1, wherein said step of outputting, according to governmental prohibitions against dissemination of criminal justice information system data to non-law enforcement entities, said response to at least a location within said secure law enforcement-controlled domain further consists of the following steps:

outputting said response also to said third party originator as an all clear indication where there is no said match between said identification indicia and said records; and preventing outputting of said response to said third party originator as an all clear indication where there is at least one said match between said identification indicia and said records.

3. A computer based system for securing critical infrastructure and important facilities, said system consisting of:

a network for receiving from a connected node to a law enforcement database network interface, at a computer system resident within a secure law-enforcement controlled domain, identification indicia that has been input from at least one non-law enforcement authorized third party originator having access to said connected node, and an operator ID tag;

a parser for parsing incoming said identification indicia and said operator ID tag;

a notification module for generating notification of access rights for an authorized user to propagate said identification indicia to said law enforcement database network interface, said authorized user being further identified by said operator ID tag in a user profile;

a database network for comparing said identification indicia with records of at least one sensitive law enforcement-only database, said at least one sensitive law enforcement-only database chosen from the group consisting of a Criminal Justice Information System database, or a law enforcement restricted database that is connected to said computer system resident within said law enforcement-controlled domain, in order to generate a response to said input, said response indicating any existence of a match between said identification indicia and said records as a not cleared message, and indicating no match between said identification indicia and said records as a cleared message; and a result return for outputting, according to governmental prohibitions against dissemination of criminal justice information system data to non-authorized law enforcement entities, said response only to said authorized user, operating in connection with said a secure law enforcement-controlled domain;

said result return further generating, after said outputting of said response to said authorized user, operating in connection with said secure law enforcement-controlled domain, a response result consisting of an alert to said at least one non-law enforcement authorized third party originator, no alert to said at least one third party originator, or a law enforcement visit to an originating location;

wherein said result return further includes outputting said response to a designated law enforcement agent for further review and taking of responsive action as needed, and further provides for record keeping within said secure law enforcement controlled domain and where a match exists between said identification indicia and said records, the issuing of an alert to said designated law enforcement agent and said non-law enforcement authorized third party originator to prompt said taking of responsive action based on the particular type of match generated.

4. The computer based system of claim 3, wherein said result return for outputting of said response to said authorized user, operating in connection with a secure law enforcement-controlled domain further comprises:

a profile for outputting said response to said third party originator as an all clear indication where there is no said match between said identification indicia and said records and for preventing outputting of said response to said third party originator as an all clear indication where there is at least one said match between said identification indicia and said records.

5. A computer based system for securing critical infrastructure and important facilities, said system comprising:

a system controller within a secure law-enforcement controlled domain;

a memory connected to said controller within said secure law-enforcement controlled domain, said memory storing instructions operative with said controller to perform the steps of:

receiving, at said computer based system, identification indicia that has been input from at least one non-law enforcement authorized third party originator having a connection to said computer based system, and an operator ID tag comparing said identification indicia with records of at least one sensitive law enforcement-only database, said at least one sensitive law enforcement-only database chosen from the group comprising a Criminal Justice Information System database, or a law enforcement restricted_database that is connected to said computer based system, in order to generate a response to said input, said response indicating any existence of a match between said identification indicia and said records as a not cleared message, and indicating no match between said identification indicia and said records as a cleared message; and outputting, according to governmental prohibitions against dissemination of criminal justice information system data to non-law enforcement entities, said response only to said authorized user operating in connection with said secure law enforcement-controlled domain;

wherein said step of outputting, according to governmental prohibitions against dissemination of criminal justice information system data to non-law enforcement entities, further includes the step of outputting said response to a designated law enforcement agent for further review and taking of responsive action as needed, and wherein said step of outputting is preserved for record keeping within said secure law enforcement domain and further includes, where a match exists between said identification indicia and said records, an alert to said designated law enforcement agent and said non-law enforcement authorized third party originator to prompt said taking of responsive action based on the particular type of match generated.

6. The computer based system for securing critical infrastructure and important facilities of claim 5, wherein said step of outputting said response to said authorized user operating in connection with said secure law enforcement-controlled domain further comprises the following steps:

outputting said response to said third party originator as an all clear indication where there is no said match between said identification indicia and said records; and preventing outputting of said response to said third party as an all clear indication where there is at least one said match between said identification indicia and said records.

* * * * *